United States Patent [19]
Hanka et al.

[11] 3,878,047
[45] Apr. 15, 1975

[54] PROCESS FOR PRODUCTION OF AT-125

[75] Inventors: Ladislav J. Hanka; David G. Martin, both of Kalamazoo, Mich.

[73] Assignee: The Upjohn Company, Kalamazoo, Mich.

[22] Filed: Sept. 6, 1974

[21] Appl. No.: 503,633

Related U.S. Application Data

[60] Division of Ser. No. 329,001, Feb. 2, 1973, which is a continuation-in-part of Ser. No. 234,347, March 13, 1972, abandoned.

[52] U.S. Cl................................................. 195/80 R
[51] Int. Cl................................................. C12d 9/00
[58] Field of Search .................................... 195/80 R

[56] References Cited
UNITED STATES PATENTS
3,616,237   10/1971   Newman et al................... 195/80 R Primary Examiner—Lionel M. Shapiro
Assistant Examiner—Robert J. Warden
Attorney, Agent, or Firm—Roman Saliwanchik

[57] ABSTRACT

Antibiotic AT-125, producible by culturing *Streptomyces sviceus* in an aqueous nutrient medium has the following structure:

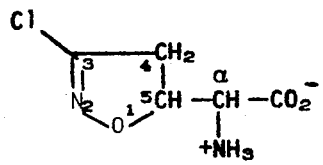

The absolute configuration of AT-125 was determined to be L-($\alpha$S,5S)-$\alpha$-amino-3-chloro-2-isoxazoline-5-acetic acid. It is an amphoteric compound and can exist in different ionic forms according to the pH of the environment. At low pH, AT-125 exists in the acid-addition salt form, at a higher pH in a zwitterion form, and at a still higher pH in a metal salt form. AT-125 inhibits the growth of *Bacillus subtilis*, *Saccharomyces pastorianus*, *Penicillium oxalicum*, *Candida albicans*, *Saccharomyces cerevisiae* and *Escherichia coli*, and can be used to inhibit such microorganisms in various environments.

6 Claims, No Drawings

PROCESS FOR PRODUCTION OF AT-125

CROSS REFERENCE TO RELATED APPLICATIONS

This application is a division of our co-pending application Ser. No. 329,001, filed on Feb. 2, 1973, which in turn is a continuation-in-part application of our application Ser. No. 234,347, filed on Mar. 13, 1972, and now abandoned.

BRIEF SUMMARY OF THE INVENTION

AT-125 is an amphoteric antibiotic which is producible by culturing an AT-125-producing actinomycete in an aqueous nutrient medium. This antibiotic has the property of adversely affecting the growth of Gram-positive and Gram-negative bacteria, for example, *Bacillus subtilis* and *Escherichia coli*. It is also active against various fungi and yeast, for example, *Saccharomyces pastorianus*, *Penicillium oxalicum*, *Candida albicans*, and *Saccharomyces cerevisiae*. Accordingly, the novel antibiotic of the subject invention can be used alone or in combination with other antimicrobial agents to prevent the growth of, or reduce the number of bacteria, yeast, and fungi, as disclosed above, in various environments. For example, it can be used for treating breeding places of silkworms, to prevent or minimize infections caused by *Bacillus subtilis*.

DETAILED DESCRIPTION

Characterization of AT-125

The structure of AT-125, consistent with determined spectral and analytical data, is

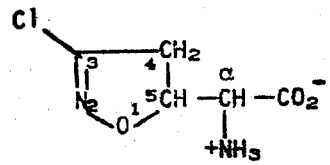

and its ion and zwitterion forms.

The NMR specturm of a saturated solution of AT-125 in $D_2O$ was determined on a Varian XL-100 spectrometer. The 100 $MH_z$ spectrum was not first order and clearly indicated the presence of 4 non-exchangeable protons. The methylene protons on $C_4$ were seen as a typical deceptive 5 line AB pattern with the strongest signal at 350 H and an apparent doublet at 359 $H_z$ and 361 $H_z$. The neighboring proton on $C_5$ was seen as an apparent doublet of triplets centered at 5.36 $\delta$ with line separations of 3.5 $H_z$ and 10 $H_z$. The signal for the amino acid methine proton was a first order doublet at 4.12 $\delta$ with $J = 3.5$ $H_z$. The IR specturm of a Nujol mull was determined on a Perkin Elmer 421 spectrophotometer. Major peaks (except Nujol) were found at 3030 (broad), 2730, 2620, 1620, 1590, 1495, 1425, 1405, 1325, 1307, 1293, 1275, 1145, 1127, 895, and 870 $cm^{-1}$.

The chemical structure of AT-125 in the crystalline form was established rigorously by X-ray diffraction. Crystalline AT-125 can be named chemically as L-($\alpha S,5S$)-$\alpha$- amino-3-chloro-2-isoxazoline-5-acetic acid.

Molecular Weight:

Rigorous X-ray structure established AT-125 as $C_5H_7ClN_2O_3$ or molecular weight as 178.6.

Solubilites:

Soluble in $H_2O$ and slightly soluble in methanol. Relatively insoluble in ethyl acetate, ether, benzene and chloroform.

Antimicrobial Properties of AT-125

The following results were obtained with a standard disc plate assay using 13 mm. paper discs and a concentration of 1 mg./ml. of AT-125.

| Microorganism | Zone of Inhibition (mm) around a 13 mm. Paper Disc |
|---|---|
| *Bacillus subtilis* (in synthetic agar) | 78 |
| *Bacillus subtilis* (in nutrient agar) | 0 |
| *Lactobacillus casei* | 0 |
| *Sarcina lutea* | 0 |
| *Staphylococcus aureus* | 0 |
| *Mycobacterium avium* | 0 |
| *Escherichia coli* (in nutrient agar) | 0 |
| *Escherichia coli* (in synthetic agar) | 36 hazy |
| *Salmonella schottmuelleri* | 0 |
| *Proteus vulgaris* | 0 |
| *Klebsiella pneumoniae* | 0 |
| *Saccharomyces pastorianus* | 53 |
| *Penicillium oxalicum* | 32 |
| *Candida albicans* (tested at 100 $\mu$g/ml.) | 20 |
| *Saccharomyces cerevisiae* (tested at 100 $\mu$g/ml.) | 38 |

THE MICROORGANISM

The actinomycete used according to this invention for the production of AT-125 is *Streptomyces sviceus*. One of its strain characteristics is the production of AT-125.

A sub-culture of the living microorganism was deposited and can be obtained from the permanent collection of the Northern Uilization and Research Division, Agriclutural Research Services, U.S. Department of Agriculture, Peoria, Illinois, U.S.A. Its accession number in this repository is NRRL 5439.

The microorganism of this invention was studied and characterized by Alma Dietz of the Upjohn Research Laboratory.

DESCRIPTION

*Streptomyces sviceus* Dietz sp. n. *N. Y. characteristics*. Aerial growth gray. Melanin positive. The color pattern on Ektachrome [Dietz, A. 1954. Ektachrome transparencies as aids in actinomycete classification. Ann. N.Y. Acad. Sci. 60: 152–154] is given in Table 1. Reference color characteristics are given in Table 2. The culture may be placed in the Gray (GY) and White (W) color series of Tresner and Backus [Tresner, H. D., and E. J. Backus. 1962. System of color wheels for streptomycete taxonomy. Appl. Microbiol. 11:335–338]. *Micro-* scopic characteristics. Oval to rectangular spores sparsely adorned with warts or short spines borne on candelabre-like sporophores. Sporophores are long, straight and coiled at the ends. Sporophores may be placed in the spiral (S) group of Pridham et al. [Pridham, T. G., C. W. Hesseltine, and R. G. Benedict. 1958. A guide for the classification of *Streptomyces* according to selected groups. Placement of strains in morphological sections. Appl. Microbiol. 6:52-79]. Spore surfaces may be placed in the warty group of Dietz and Mathews [Dietz, A., and John Mathews, 1970. Classification of *Streptomyces* spore surfaces into five groups. Appl. Microbiol. 21:527–533]. *Cultural and biochemical characteristics;* See Table 3. *Carbon utilization*. The growth of the culture on carbon compounds was determined using the procedures of Pridham and Gottlieb [Pridham, T. G. and D. Gottlieb. 1948. The utilization of carbon compounds by some Actinomycetales as an aid for species determination. J. Bacteriol. 56:107–114] and Shirling and Gottlieb [Shirling, E. B., and D. Gottlieb. 1966. Methods for characterization of Streptomyces species. Int. J. Sys. Bacteriol. 16:313–340]. In the procedure of Pridham and Gottlieb, *S. sviceus* showed fair growth on the basal medium, dulcitol, D-sorbitol, salicin, and sodium oxalate; good growth on D-xylose, L-arabinose, rhamnose, D-fructose, D-galactose, D-glucose, D-mannose, maltose, sucrose, lactose, cellobiose, raffinose, dextrin, inulin, soluble starch, glycerol, D-mannitol, inositol, sodium acetate, sodium citrate, and sodium succinate; poor gowth on phenol, sodium formate, and sodium tartrate; no growth on cresol and sodium salicylate. In the procedure of Shirling and Gottlieb the culture did not grow on the negative control (basal medium only). Growth was good on the positive control (basal medium plus glucose). Growth was equal to or greater than the glucose control on the basal medium plus L-arabinose, sucrose, D-xylose, inositol, D-mannitol, D-fructose, rhamnose, and raffinose, growth was doubtful with cellulose.

Temperature

The culture grew well at 18°–28°C. on Bennett's and Czapek's sucrose agars; at 18°–37°C. on maltose-tryptone agar. There was no growth at 45° and 55°C. on Bennett's, Czapek's sucrose, and maltose-tryptone agars.

Antibiotic-producing properties

The culture produces the antimetabolite antibiotic AT-125.

Source. Soil

DISCUSSION

*Streptomyces sviceus* is an actinomycete with characteristics of the genus *Streptomyces* as set forth in Bergey's Manual of Determinative Bacteriology, seventh edition [Breed, Robert S., E. G. D. Murray, and Nathan R. Smith. 1957. Bergey's manual of determinative bacteriology, seventh Edition, the Williams and Wilkins Co., Baltimore]. The culture, which was isolated from soil, is distinctly different from *Streptomyces* species in the Upjohn culture collection and, insofar as can be determined, from those in the literature descriptions in Bergey's Manual, supra, Gauze [Gauze, G. F., T. P. Preobrazenskaya, E. S. Kudrina, N. O. Blinov, I. D. Ryabova, and M. A. Iveshnikova. 1957. Problems in the classification of antagonistic actinomycetes. State Publishing House for Medical Literature, Moscow. English edition translated by Fritz Danga; David Gottlieb (ed.).

The American Institute of Biological Sciences, Washington, D. C.], Hutter [Hutter, R. 1967. Systematik der Streptomyceten unter besondere Berucksictigung der von ihnen gerbildeten Antibiotica. S. Karger, Basel], Krassilinkov [Krassilnikov, N. A. 1949. *Actinomycetes*. In Guide to the identification of bacteria and *Actinomycetes*. Academy of Sciences, U.S.S.R., Moscow. English edition translated by J. B. Routien, Chas. Pfizer and Co., Inc., 1957], Waksman [Waksman, S. A. 1961. The actinomycetes, Vol. 2, Classification, indentification, and descriptions of genera and species. The Williams and Wilkins Co., Baltimore], and Shirling and Gottlieb [Shirling, E. B., and D. Gottlieb. 1968. Cooperative description of type cultures of *Streptomyces*. II. Species descriptions from first study. Int. J. Sys. Bacteriol. 18:69–189; Cooperative description of type cultures of Streptomyces. III (1968) Additional species descriptions from first and second studies. Int., J. Sys. Bacteriol. 18:279–392; Cooperative description of type clutures of *Streptomyces*. IV. (1969) Species descriptions from the second, third and fourth studies. Int. J. Sys. Bacteriol. 19:391–512].

*Streptomyces sviceus* showed some similarity to *Streptomyces hawaiiensis* [Cron, M. J., D. F. Whitehead, I. R. Hooper, B. Heinemann, and J. Lein. 1956. Bryamycin, a new antibiotic. Antibiotics and Chemotherapy 6:63–67] ATCC 122236. Both cultures are melanin-positive and have similar carbon utilization patterns in the synthetic medium of Pridham and Gottlieb. *Streptomyces hawaiiensis* has open spiral sporophores which are shorter and less distinctive than those of the new culture which are long and coiled at the tip. The spores, as observed by transmission electron microscopy, are round to oval and covered with fine spines for *S. hawaiiensis* and oval to rectangular with a sparsely warty to spiny surface for *S. sviceus*. Distinguishing characteristics are cited in Table 4.

*S. sviceus* is easily distinguished by its distinctive color pattern and microscopic characteristics from characterized species of *Streptomyces* in the Upjohn culture collection and, as far as can be determined, from those cultures characterized in the literature. The cultural characteristics cited in the tables reinfroce the distinctive features of *S. sviceus*. A unique property of this organism in its ability to produce antibiotic AT-125. It is proposed that the organism characterized herein be considered a new species of *Streptomyces* designated *Streptomyces sviceus* (from svice or svicen Czech for candle or candle holder - sporophores of cultures are candelabra-like) Dietz, sp. n. the type species is designated the type variety *Streptomyces sviceus* var. *sviceus* in accordance with Rule 9d (2) of the International Code of Nomenclature of Bacteria [International code of Nomenclature of Bacteria. 1966. Edited by the Editorial Board of the Judicial Commission of the International Committee on Nomenclature of Bacteria. Intern. J. System. Bacteriol. 16:459–490].

TABLE 1

| Color Pattern of *Streptomyces sviceus* on Ektachrome* | | |
| Agar Medium | Surface | Reverse |
| --- | --- | --- |
| Bennett's | Lavender-gray | Brown |
| Czapek's sucrose | Lavender-gray | Red-brown |
| Maltose tryptone | Lavender-gray | Brown |
| Peptone-iron | No aerial growth | Brown |

TABLE 1-Continued

Color Pattern of *Streptomyces sviceus* on Ektachrome*

| Agar Medium | Surface | Reverse |
|---|---|---|
| 0.1% tyrosine | Fair lavender-gray | Red-brown |
| Casein starch | Fair lavender-gray | Light brown |

*Dietz, A., "Ektachrome Transparencies as Aids in Actinomycete Classification", Annals of the New York Academy of Sciences, 60:152-154, 1954.

The new compound of the invention is produced when the elaborating organism is grown in an aqueous nutrient medium under submerged aerobic conditions. It is to be understood also that for the preparation of limited amounts, surface cultures and bottles can be employed. The organism is grown in a nutrient medium containing a carbon source, and an assimilable nitrogen

TABLE 2

Reference Color Characteristics of *Streptomyces sviceus*

| Agar Medium | | Color Harmony Manual, 3rd ed., 1948* | ISCC-NBS Method of Designating Color and a Dictionary of Color Names, Circular 553, 1955** |
|---|---|---|---|
| Bennett's | S | 3fe silver gray | 63gm light brownish gray |
|  | R | 3ni clove brown | 77m moderate yellowish brown |
|  |  |  | 95g moderate olive brown |
|  | P | 3ig beige brown, mist brown | 80m grayish yellowish brown |
| Czapek's sucrose | S | 3lc amber, butterscotch | 71m moderate orange yellow |
|  | R | 2ge covert tan, griege | 94m light olive brown |
|  |  |  | 109gm light grayish yellow |
|  | P | 3ge beige camel | 79m light yellowish brown |
| Maltose tryptone | S | a white | 263gm white |
|  | R | 3lg adobe brown, cinnamon brown, light brown | 77gm moderate yellowish brown |
|  | P | 3ig camel, maple sugar, tan | 80m grayish yellowish brown |
|  |  |  | 95g moderate olive brown |
| Yeast extract-malt extract | S | 3fe silver gray | 63gm light brownish gray |
| (ISP-2) | R | 4nl chocolate, dark brown | 64m brownish gray |
|  |  |  | 81g dark grayish yellowish brown |
|  | P | 3li beaver | 80m grayish yellowish brown |
|  |  |  | 95g moderate olive brown |
| Oatmeal (ISP-3) | S | 3fe silver gray | 63gm light brownish gray |
|  | R | 2ig slate tan to 3ml beaver gray | 110g grayish yellow |
|  |  |  | 112m light olive gray |
|  |  |  | to 96g dark olive brown |
|  |  |  | 266m dark gray |
|  | P | 2ih dark covert gray | 112m light olive gray |
|  |  |  | 265m medium gray |
| Inorganic-salts starch (ISP-4) | S | 3fe silver gray | 63gm light brownish gray |
|  | R | 3ge beige, camel | 79m light grayish yellowish brown |
|  |  |  | 94m light olive brown |
|  | P | 3ge beige, camel | 79m light grayish yellowish brown |
|  |  |  | 94m light olive brown |
| Glycerol-asparagine (ISP-5) | S | C light gray | 264gm light gray |
|  | R | 3ml beaver gray | 96g dark olive brown |
|  | P | 3fe silver gray | 63gm light brownish gray |

S = Surface
R = Reverse
P = Pigment
All readings were made using the glossy surface of the chips.
*Jacobson, E., W. C. Granville, and C. E. Foss. 1948. Color Harmony Manual, 3rd Edition. Container Corporation of America, Chicago, Illinois.
**Kelly, K. L., and D. B. Judd. 1955. The ISCC-NBS Method of Designating Colors and a Dictionary of Color Names. U. S. Dept. Commerce Circ. 553.

TABLE 3

Cultural and Biochemical Characteristics of *Streptomyces sviceus*

| Medium | Surface (aerial growth) | Reverse | Other Characteristics |
|---|---|---|---|
| Agar Media |  |  |  |
| Peptone-iron | Trace gray | Brown | Brown pigment (melanin positive) |
| Calcium malate | Poor gray-white | White to cream | Malate solubilized around growth |
| Glucose asparagine | Poor lavender-gray | Olive | — |
| Skim milk | Very slight trace gray | Yellow-tan-brown | Yellow-tan-brown pigment Casein not solubilized |
| Tyrosine | Poor gray | Tan brown | Brown pigment Tyrosine solubilized |
| Xanthine | Poor gray-white | Cream-tan | cream-tan pigment Xanthine solubilized |
| Nutrient starch | Fair gray-white | Cream-yellow | Yellow pigment Starch hydrolyzed |
| Yeast extract-malt extract | Good gray | Brown | Tan-brown pigment |
| Peptone-yeast-extract-iron (ISP-6) | — | Brown | Brown pigment (melanin-positive) |

TABLE 3 — Continued

Cultural and Biochemical Characteristics of *Streptomyces sviceus*

| Medium | Surface (aerial growth) | Reverse | Other Characteristics |
|---|---|---|---|
| Tyrosine (ISP-7) | Gray | Brown | Brown pigment (melanin-positive) 50%<br>No pigment (melanin-negative) 50% |
| Gelatin Media | | | |
| Plain | Tracewhite on surface pellicle | — | Yellow to olive pipgment<br>No liquefaction |
| Nutrient | — | — | Olive tan pigment<br>No liquefaction |
| Broth Media | | | |
| Synthetic nitrate | Colorless surface pellicle | — | Pale yellow pigment<br>Compact bottom growth<br>Nitrate not reduced to nitrite |
| Nutrient nitrate | Colorless surface pellicle | — | Brown pigment<br>Compact bottom growth<br>Nitrate not reduced to nitrite |
| Litmus milk | Brown surface ring | — | Litmus reduced in four of six tubes<br>No peptonization<br>pH 5.3 |

TABLE 4

Differentiation of *Streptomyces sviceus* and *Streptomyces hawiiensis* ATCC 12236, UC 2504

| | *Streptomyces sviceus* | *Streptomyces hawaiiensis* ATCC 12236, UC 2504 |
|---|---|---|
| Reference color* | White (W) to Gray (GY) | White (W) to Yellow (Y) to Red (R) |
| Sporophores** | Long, straight and coiled at tip (S) (Many candelabra-like) | Moderately short open spiral (RA) to spiral (S) |
| Spore surface*** | Warty to spiny (Spines short and sparse) | Spiny (Spines short to long) |
| Gelatin (Plain and Nutrient) | No liquefaction | Complete liquefaction |
| Litmus milk | pH 5.3 | pH 6.1 |
| Tyrosine agar (ISP-7) | 50% Melanin positive & 50% Melanin negative | Melanin negative |
| Antibiotic production | Products AT-125 | Produces bryamycin |

*Tresner, H. D., and E. J. Backus. 1962. System of color wheels for streptomycete taxonomy. Appl. Microbiol. 11:335–338.
**Pridham. T. G., W. C. Hesseltine, and R. G. Benedict. 1958. A guide for the classification of *Streptomyces* according to selected groups. Placement of strains in morphological sections. Appl. Microbiol. 6:52–79.
***Dietz, A., and John Mathews, 1970. Classification of *Streptomyces* spore surfaces into five groups. Appl. Microbiol. 21:527–533.

NOTE: The "UC" designation in Table 4 refers to The Upjohn Company culture collection.

compound or porteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distillers' solubles, animal peptone liquors, meat and bone scraps, and the like. Combinations of these carbon and nitrogen sources can be used advantageously. Trace metals, for example, zinc, magnesium, manganese, cobalt, iron and the like need not be added to the fermentation medium since tap water and unpurified ingredients are used as medium components.

Production of the compound of the invention can be effected at any temperature conducive to satisfactory growth of the microorganism, for example between about 18° and 40°C., and preferably between about 20° and 32°C. Ordinarily, optimum production of the compound is obtained in about 2 to 10 days. The medium normally remains weakly acidic (pH 5.5–7.0) during the fermentation. The final pH is dependent, in part on the buffers present, if any, and in part on the intial pH of the culture medium which is advantageously adjusted to about pH 7.0 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating this borth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new antibiotic of the invention, AT-125, is an amphoteric compound. It is soluble in $H_2O$ and slightly solube in $CH_3OH$.

A variety of procedures can be employed in the isolation and purification of AT-125, for example, absorption procedures followed by elution with a suitable solvent, column chromatography, partition chromatography, and crystallization from solvents.

In a preferred recovery process, AT-125 is recovered from its culture medium by filtration through a medium porosity diatomite, for example FW 40 supplied by Eagle Picher. Other suitable diatomites are marketed under the trade names Super Cel (Johns Manville's fine diatomite), Dicalite 4200 (Great Lakes), and Miraflow 40 (Eagle Picher).

The clear beer is percolated through a chromatographic column packed with a styrene type suflonic acid resin. Dowex 50 in the hydrogen form is preferred, advantageously highly crosslinked, for example, Dowex 50 × 16. Other suitable resins are marketed under the tradenames Amberlite IR-120, Nalcite HCR, Chempro C-20, Permutit Q and Zeokarb 225. After appropriate washing of the column the antibiotic is eluted with a base, $NH_4OH$ is preferred. The antibiotically active elutates obtained from the above chromatographic column are pooled and concentrated.

In a preferred purification procedure, the resulting aqueous concentrate, described above, at a neutral pH (6.2–7.8), is percolated through a column containing a weakly basic styrene type polyamine resin. Amberlite IR 45 ($OH^-$) is preferred. Other resins which can be used are Amberlite IR 4B, Nalcite WBR, DeAcidite E and Duolite A.2.

The column is washed with deionized water, 50 percent aqueous MeOH, and 90 percent aqueous MeOH, and then eluted with 0.1 N HOAc in 90 percent MeOH. Active eluate fractions are pooled, then evaporated to dryness under reduced pressure to give a residue. MeOH can be substituted by $H_2O$.

The residue, obtained as described above, is then subjected to partition chromatography by first dissolving it in the lower phase of a solvent system consisting of a mixture of n-butanol, benzene, methanol and deionized water (2:1:1:1). The lower phase containing the residue from the above-described weakly basic styrene type polyamine resin column is homogenized with a medium porosity diatomite, for example, Eagle Pichers FW 40 and upper phase of the solvent system described above. The resulting homogenized solid is then added to the top of a column containing a medium porosity diatomite which was prepared previously by slurring the medium porosity diatomite in upper phase of the solvent mixture, described above, agitated thoroughly with lower phase of said solvent mixture, pouring into a chromatographic column, and allowing the bed to settle while passing upper phase through the column. The active eluates from the column are collected, pooled and evaporated to a dry residue. Crystalline AT-125 is obtained by crystallization with a suitable solvent (methanol is preferred).

Other solvents which can be used are 95 percent EtOH, aqueous BuOh, and $H_2O$.

An alternate procedure for the recovery of AT-125 from the filtered fermentation beer is by absorption on a suitable ion exhange resin, for example Dowex 1 ($OAc^-$) at pH 9 - 10, or IR 45 $OH^-$) at pH 6 - 7, and after washing the resin with $H_2O$, the AT-125 is recovered by elution with aqueous or methanolic $NH_4OH$ or HOAc. Further, the filtered clear fermentation beer may be absorbed on carbon and the AT-125 activity eluted with an appropriate solvent mixture, for example, aqueous acetone.

An alternate purification procedure which can be used involves chromatography on silica gel with methanol in $CHCl_3$ or $CH_2Cl_2$, or with mixtures of benzene (or toluene), 95 percent ETOH, and HOAc.

The titer of AT-125 in the beer during various stages of recovery operations can be monitored by a disc-plate assay using Bacillus subtilis cultivated in a synthetic medium of the folliwng composition:

| | |
|---|---|
| $Na_2HPO_4 \cdot 7H_2O$ | 1.7 g. |
| $KH_2PO_4$ | 2.0 g. |
| $(NH_4)_2SO_4$ | 1.0 g. |
| $MgSO_4$ | 0.1 g. |
| Glucose | 2.0 g. |
| Bacto Agar* | 15.0 g. |
| Distilled water | 1 liter |
| Metallic ion stock solution** | 1 ml. |

*Bacto Agar provided by Difco Laboratories, Detroit, Michigan.
**Metallic ion stock solution consists of the following:

| | |
|---|---|
| $NaMoO_4 \cdot 2H_2O$ | 200 μg/ml. |
| $CoCl_2$ | 100 μg/ml. |
| $CuSO_4$ | 100 μg/ml. |
| $MnSO_4$ | 2 mg./ml. |
| $CaCl_2$ | 25 mg./ml. |
| $FeCl_2 \cdot 4H_2O$ | 5 mg./ml. |
| $ZnCl_2$* | 5 mg./ml. |

*$ZnCl_2$ has to be dissolved separately using a drop of 0.1 N HCl for 10 ml. of water. The stock solution is heated to bring all the compounds in solution, kept standing for 24 hours, and sterile filtered.

This medium is inoculated with a spore suspension of B. substilis (1.5 × $10^{10}$ cells/ml.) at a rate of 0.5 ml./liter. The beer samples are applied to 12.5 mm. diamter adsorbent paper discs (0.08 ml./disc), the assay system is incubated overnight at 37° C., and the zones of inhibition are measured. The potency of the sample is related to the diameter of the inhibition zone by means of the usual standard curve.

This medium when seeded with B. subtilis can also be used for the detection of antibiotic AT-125. In this procedure, papergrams are developed with the upper phase of a solvent mixture of 1 butanol, methanol, benzene, and $H_2O$ (2: 1: 1: 1). After development the sheet is dried and the papergrams are then laid on transparent papergram trays containing the seeded medium and withdrawn after about 20 minutes. The trays are incubated overnight as above, and inhibition zones observed.

Since AT-125 is amphoteric compound, it forms salts with acids, alkali metals (including ammonia), alkaline earth metals (including magnesium and aluminum), and amines. Metal salts can be prepared by dissolving AT-125 in water, and adding a dilute metal base until the pH of the solution is 7 to 8. AT-125 metal salts include the sodium, potassium and calcium salts. Amine salts, including those with organic bases such as primary, secondary, and tertiary, mono-, di-, and polyamines can also be formed using the above-described or other commonly employed procedures. Further, ammonium salts can be made, by well-known procedures. Other salts are obtained with therapeutically effective bases which impart additonal thereapeutic effects thereto. Such bases are, for example, the purine bases such as theophyllin, theobromin, caffein, or derivatives of such purine bases; antihistaminic bases which are capable of forming salts with weak acids; pyridine compounds such as nicotinic acid amide, isonicotinic acid hydrazide, and the like; phenylalkylamines such as adrenalin, ephedrin, and the like; choline and others.

Acid salts can be made by neutralizing AT-125 with the appropriate acid to below about pH 7.0, and advantageously to about pH 2 to pH 6. Suitable acids for this purpose include hydrochloric, sulfuric, phosphoric, sulfamic, hydrobromic, and the like. Acid and base salts of AT-125 can be used for the same biological purposes as the parent compound.

AT-125 is active against *Escherichia coli* and can be used to reduce, arrest, and eradicate slime production in papermill systems caused by its antibacterial action against this microorganism. AT-125 also can be used to prolong the life of cultures of *Trichomonas foetus*, *Trichomonas hominis*, and *Trichomonas vaginalis* by freeing them of *Escherichia coli* contamination. Further, AT-125 can be used as the antifungal agent in the shoe uppers as disclosed in U.S. Pat. No. 3,130,505. Still, further, since AT-125 is active against *Bacillus subtilis* it can be used to minimize or prevent odor in fish or fish crates caused by this organism, or AT-125 can be used to swab laboratory benches and equipment in a mycological laboratory.

AT-125 is active against L 1210 murine leukemia in laboratory mice, and, thus, can be used to treat said mice.

The following examples are illustrative of the process and products of the present invention but are not to be construed as limiting. All percentages are by weight and all solvent mixture proportions are by volume unless otherwise noted.

Example 1

A. Fermentation

A soil stock of *Streptomyces svcieus*, NRRL 5439, is used to inoculate 500-ml. Erlenmeyer seed flasks containing 100 ml. of sterile medium consisting of the following ingredients:

| | |
|---|---|
| Dextrose | 25 g./l. |
| Pharmamedia* | 25 g./l. |
| Tap water q.s. | to 1 liter |

*Product of Trader's Oil Mill Company, Fort Worth, Texas.

The seed medium presterilization pH is 7.2. The seed inoculum is grown for two days at 28°C. on a Gump rotary shaker operating at 250 r.p.m. Seed inoculum, prepared as described above, is used to inoculate 500-ml. Erlenmeyer fermentation flasks containing 100 ml. of sterile fermentation medium consisting of the following ingredients:

| | |
|---|---|
| Calcium carbonate | 5 g./l. |
| Sodium chloride | 2 g./l. |
| Starch | 10 g./l. |
| Mannitol | 10 g./l. |
| Phytone* | 10 g./l. |
| KaySoy** | 10 g./l. |
| Lard oil | 1 ml./100 ml. |
| Tap water q.s. | to 1 liter |

*Papaic digest of soya meal.
**Finely milled fat extracted soybean meal.

The presterilization pH is adjusted to 7.2 with 4 N NaOH. The fermentation flasks are inoculated at the rate of 5 ml. of seed inoculum per 100 ml. of fermentation medium. The fermentation flasks are grown for 2 − 3 days at a temperature of 32°C. on a Gump rotary shaker operating at 250 r.p.m. Maximum production of AT-125 in a flask fermentation is generally realized on the second day after which the titer of antibiotic gradually drops off. A typical fermentation production curve in a shake flask is as follows:

| Hours | Bu/ml. of AT-125 |
|---|---|
| 48 | |
| 72 | 22 |
| 96 | 26 |
| 120 | 16 |

A biounit of activity (Bu) is defined as that quantity of antibiotic necessary to achieve a 20 mm. zone of inhibition from a ½ inch disc treated with 0.08 ml. of its solution. The disc-plate assay is as described previously.

B. RECOVERY

Whole beer (250 liters) from an AT-125 fermentation, as described above, is filtered through a medium porosity diatomite. The resulting clear beer is percolated at pH 7-8 through 25 liters of freshly regenerated Dowex 50 × 16 ($H^+$) in a chromatographic column. The column is washed with 50 liters of deionized $H_2O$ and then eluted with 120 liters of 1 N $NH_4OH$; 6 liter fractions are collected. The most active fractions (inhibition zones >50 mm.) are determined by applying dipped, air-dried discs to a tray of *Bacillus subtilis* (grown in synthetic medium as described previously). The active fractions are pooled and concentrated uner reduced pressure to remove excess $NH_4OH$. Solids determinations indicate that the crude aqueous concentrate contains 2,950 g. and the active eluates contain 244 gm. The solids in the active eluates are approximately 13 times more potent than the clear beer solids by *Bacillus subtilis* synthetic assay.

C. PURIFICATION

1. Weakly basic styrene type polyamine resin column

The active aqueous concentrated Dowex 50 eluate, prepared as described above, at pH 7–7.5, is percolated through a column containing 4 liters of Amberlite IR 45 ($OH^-$). The column is washed with 8 liters of deionized $H_2O$, 4 liters of 50 percent aqueous MeOH and 8 liters of 90 percent aqueous MeOH, and then eluted with 0.5 N HOAc in 90 percent MeOH; 2.1 fractions are collected. The most active fractions by *Bacillus subtilis* assay, are pooled and evaporated to dryness under reduced pressure; yield, 9.40 g. of residue having a *Bacillus subtilis* potency 28 times greater than the Dowex 50 eluate residue, described above. 2. Partition chromatography A mixture of n-butanol, benzene, methanol, and deionized water (2:1:1:1) is agitated and allowed to settle into two layers; the layers are then separated. A medium porosity diatomite (2340gm.) is slurried in upper phase, agitated thoroughly with 900 ml. of lower phase, and poured into a chromatographic column, allowing the bed to settle while passing the upper phase through the column. The residue from the IR 45 eluate, prepared as described above, is dissolved in 25 ml. of lower phase and homogenized with 75 g. of a medium porosity diatomite and 50 ml. of upper phase. The resulting homogenized solid is carefully added to the top of the column and elution with upper phase initiated; 500 ml. fractions are collected. The most active fractions by *Bacillus subtilis* assay are evaporated to dryness under reduced pressure affording 3.93 gm. of residue having a *Bacillus subtilis* potency 2.9 times that of the IR 45 eluate residue, described above.

3. Crystallization

The residue, obtained by partition chromatography, as described above, is crystallized from $CH_3OH$ and recrystallized from aqueous $CH_3OH$ three times affording 362 mg. of pure crystalline AT-125 having approximately 4 times the *Bacillus subtilis* potency of the highly active residue from partition chromatography, described above.

Salts of antibiotic AT-125 can be made by the procedures disclosed supra. These salts, also as disclosed supra, are useful for the same purposes as the parent antibiotic.

The invention described herein was made in the course of, or under, Contract PH43-NCI-69-1023 with the National Cancer Institute, National Institutes of Health, Bethesda, Maryland 20014.

We claim:

1. A process for making antibiotic AT-125

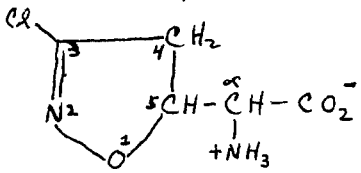

which comprises cultivating *Streptomyces sviceus* in an aqueous nutrient medium under aerobic conditions until substantial antibiotic activity is imparted to said medium by the production of antibiotic AT-125.

2. A process according to claim 1 which comprises cultivating *Streptomyces sviceus* in an aqueous nutrient medium containing a source of assimilable carbohydrate and assimilable nitrogen under aerobic conditions until substantial antibiotic activity is imparted to said medium by the production of antibiotic AT-125 and isolating the antibiotic AT-125 so produced.

3. A process according to claim 2 in which the isolation comprises filtering the fermentation medium, absorbing the filtered beer on an ion exchange resin, eluting antibiotic AT-125 from said resin and subjecting said eluates to purification procedures.

4. A process according to claim 3 wherein said ion exchange resin is a highly crosslinked styrene type sulfonic acid resin.

5. A process according to claim 4 wherein said resin is Dowex 50 × 16 in the hydrogen form.

6. A process according to claim 3 wherein said purification procedures comprise:
 1. weakly basic styrene type polyamine resin chromatography,
 2. partition chromatography; and
 3. crystallization.

* * * * *

UNITED STATES PATENT OFFICE
CERTIFICATE OF CORRECTION

PATENT NO. : 3,878,047
DATED : April 15, 1975
INVENTOR(S) : Ladislav J. Hanka and David G. Martin It is certified that error appears in the above-identified patent and that said Letters Patent are hereby corrected as shown below:

Column 2, line 50, for "Agriclutural" read -- Agricultural --; line 59, for "N. Y. characteristics" read -- Color characteristics --. Column 3, line 31, for "gowth" read -- growth --. Column 4, line 22, for "clutures" read -- cultures --; line 45, for "reinfroce" read -- reinforce --. Column 8, under Other Characteristics in Table 3, for "yellow to olive pipgment" read -- yellow to olive pigment --. Column 7, under Streptomyces sviceus in Table 4, for "Products AT-125" read -- Produces AT-125 --. Column 8, line 59, for "borth" read -- broth --. Column 9, line 3, for "solube" read -- soluble --; line 17, for "suflonic" read -- sulfonic --; line 62, for "BuOh" read -- BuOH --; line 66, for "OH-)" read -- (OH-) --. Column 10, line 13, for "folliwng" read -- following --; line 33, for "B. substilis" read -- B. subtilis --; line 35, for "diamter" read -- diameter --; line 50, for "is amphoteric" read -- is an amphoteric --; line 63, for "additonal" read -- additional --. Column 12, line 8, under column Bu/ml of AT-125, for "  " read -- 56 --; line 30, for "uner" read -- under --; line 45, for "2.1" read -- 2 1. --. Column 13, line 2, for "resiude" read -- residue --.

Signed and Sealed this seventh Day of October 1975

[SEAL]

Attest:

RUTH C. MASON
Attesting Officer

C. MARSHALL DANN
Commissioner of Patents and Trademarks